(12) United States Patent
Bagust et al.

(10) Patent No.: US 6,276,516 B1
(45) Date of Patent: Aug. 21, 2001

(54) FLOW CONTROL DEVICE

(75) Inventors: Kevin Ronald Bagust, Baullham Hills; Stanislaw Welik, Marayong; Robert Brydon Rudd, Balmain, all of (AU)

(73) Assignee: Transfield PTY Limited, Sydney (AU)

( * ) Notice: Subject to any disclaimer, the term of this patent is extended or adjusted under 35 U.S.C. 154(b) by 0 days.

(21) Appl. No.: 09/327,586

(22) Filed: Jun. 8, 1999

(30) Foreign Application Priority Data

Jun. 9, 1998 (AU) .................................................... PP3993

(51) Int. Cl.[7] .................................................. B65G 47/19
(52) U.S. Cl. .......................... 198/530; 198/532; 198/533
(58) Field of Search ..................................... 198/530, 532, 198/533, 562, 550.3

(56) References Cited

U.S. PATENT DOCUMENTS

| | | | |
|---|---|---|---|
| 3,918,572 | * 11/1975 | Wirth et al. | 198/66 |
| 3,990,588 | * 11/1976 | Dibben | 214/15 |
| 4,023,673 | * 5/1977 | Hansen | 198/735 |
| 4,201,287 | * 5/1980 | Straub et al. | 198/530 |
| 4,250,987 | * 2/1981 | Trammell et al. | 198/530 |
| 4,323,178 | * 4/1982 | Longinotti | 222/415 |
| 4,462,520 | * 7/1984 | Strehlow | 198/525 |
| 4,529,085 | * 7/1985 | Johnson | 198/532 |
| 4,553,660 | * 11/1985 | Bennett et al. | 198/425 |
| 4,583,901 | * 4/1986 | Tyrer | 414/144 |
| 4,848,534 | * 7/1989 | Sandwall | 198/535 |
| 4,871,059 | * 10/1989 | Rantanen et al. | 198/532 |
| 4,923,358 | * 5/1990 | Van Mill | 414/519 |
| 4,978,252 | * 12/1990 | Sperber | 406/64 |
| 5,657,902 | * 8/1997 | Kraus | 222/56 |
| 5,741,106 | * 4/1998 | Sridhar | 414/142.3 |

FOREIGN PATENT DOCUMENTS

B21771   6/1984  (AU) .

* cited by examiner

*Primary Examiner*—Christopher P. Ellis
*Assistant Examiner*—Rashmi Sharma
(74) *Attorney, Agent, or Firm*—Abelman, Frayne & Schwab

(57) ABSTRACT

A flow control device 7A for use with apparatus 1 for discharging granular material from storage, which has an inlet adapted to receive granular material from the storage, a containment chute 7 for receiving material from the inlet and for discharging the material through a discharge opening to a conveyor system 13, includes a pivotally mounted segment gate 11 adapted to move in an arcuate manner across the discharge opening 8 of the containment chute 7 to vary the cross-sectional area of the discharge opening 8 and an actuator 12 for moving or positioning the segment gate.

4 Claims, 3 Drawing Sheets

FLOW CONTROL DEVICE

BACKGROUND OF THE INVENTION

This invention relates to the discharge of bulk material from storage to a conveying system and more particularly to control devices for regulating the flow of such bulk material.

For the sake of convenience, the invention will be described in relation to the discharge of particulate material from a stockpile using a vibratory stockpile reclaimer but it is to be understood that the invention is not limited thereto as it may be applied to other circumstances where it is necessary to regulate the flow of bulk material from storage to a conveying system. For example, the invention could be used on the outlet of a silo, hopper, rail car or bunker as well as a stockpile where controlled discharge of high volumes of bulk material such as gravel, coal, grain ore, sand and the like is required and where blending from a number of outlets may be required. A typical prior art reclaimer is disclosed in Australian Patent Specification 555,108.

DESCRIPTION OF THE RELATED ART

Large bulk storage reclaim systems usually comprise a single or series of vibratory stockpile dischargers which promote flow of material into a conical discharge section then to a flow control device that regulates the amount of material discharged onto the conveying system.

A typical prior art flow control device is shown in Australian Patent Specification 555,108. It is an object of this invention to provide an improved flow control device for use in the discharge of bulk material from storage.

BRIEF SUMMARY OF THE INVENTION

According to the invention there is provided a flow control device for use with apparatus for discharging granular material from storage, said apparatus including an inlet adapted to receive granular material from the storage, a containment chute for receiving material from the inlet and for discharging the material through a discharge opening to a conveyor system, said flow control device comprising a pivotally mounted segment gate adapted to move in an arcuate manner across the discharge opening of the containment chute to vary the cross-sectional area of the discharge opening and an actuator or prime mover for moving or positioning the segment gate.

In a preferred form of the invention, the flow control device includes a displaced air control system that directs displaced air from the granular material flow where it is recombined with the discharge material at the conveyor level.

In a further preferred form of the invention, the flow control device includes means for vibrating the floor of the containment chute on the entire containment chute to assist the discharge of difficult materials or when blending at low discharge rates.

In order that the invention may be more readily understood and put into practical effect, reference will now be made to the accompanying drawings in which:

DETAILED DESCRIPTION OF THE INVENTION

Figure 1:
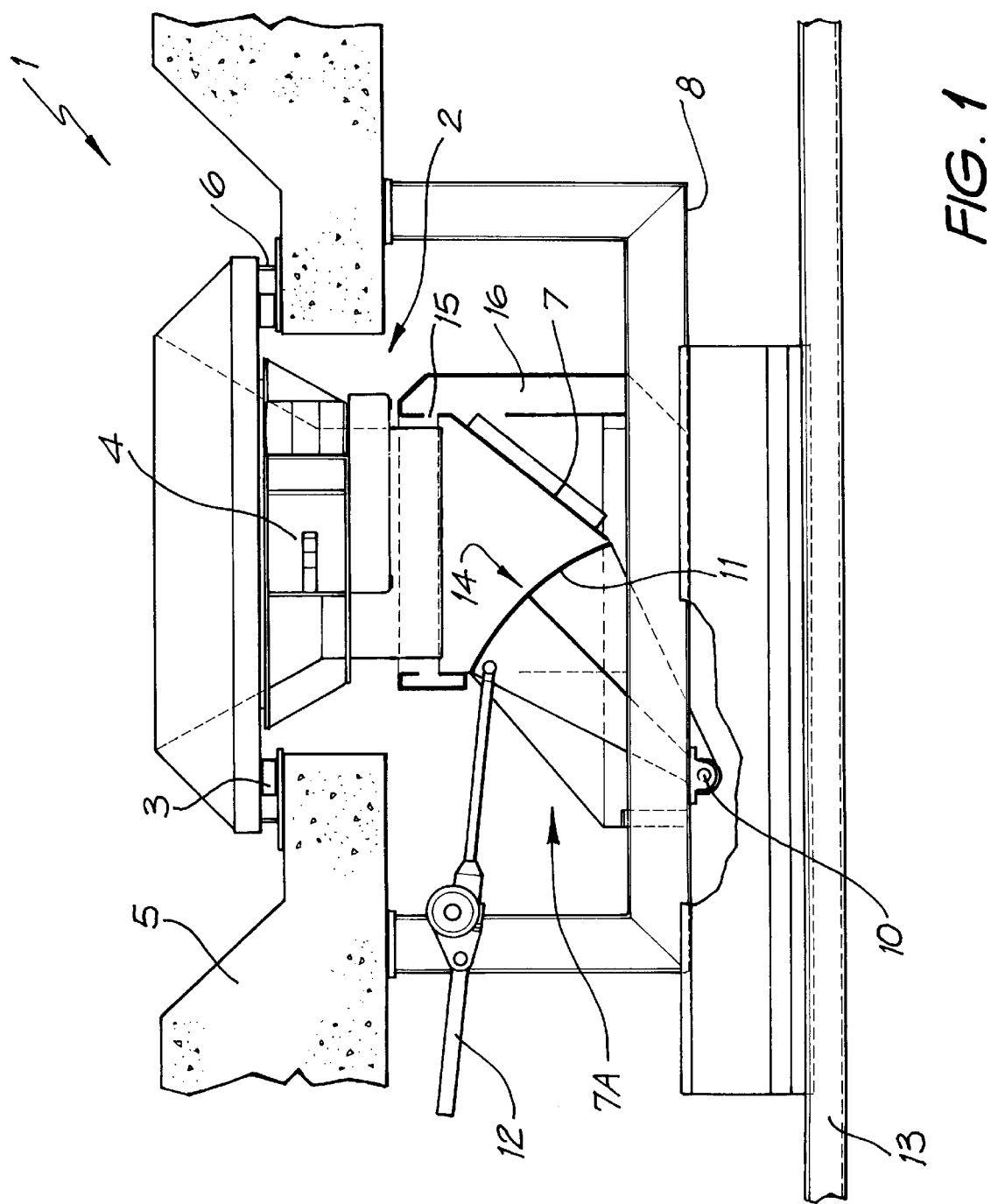
FIG. 1 is a side elevational view of a flow control device according to one embodiment of the invention installed with a vibratory stockpile reclaimer.
Figure 2:
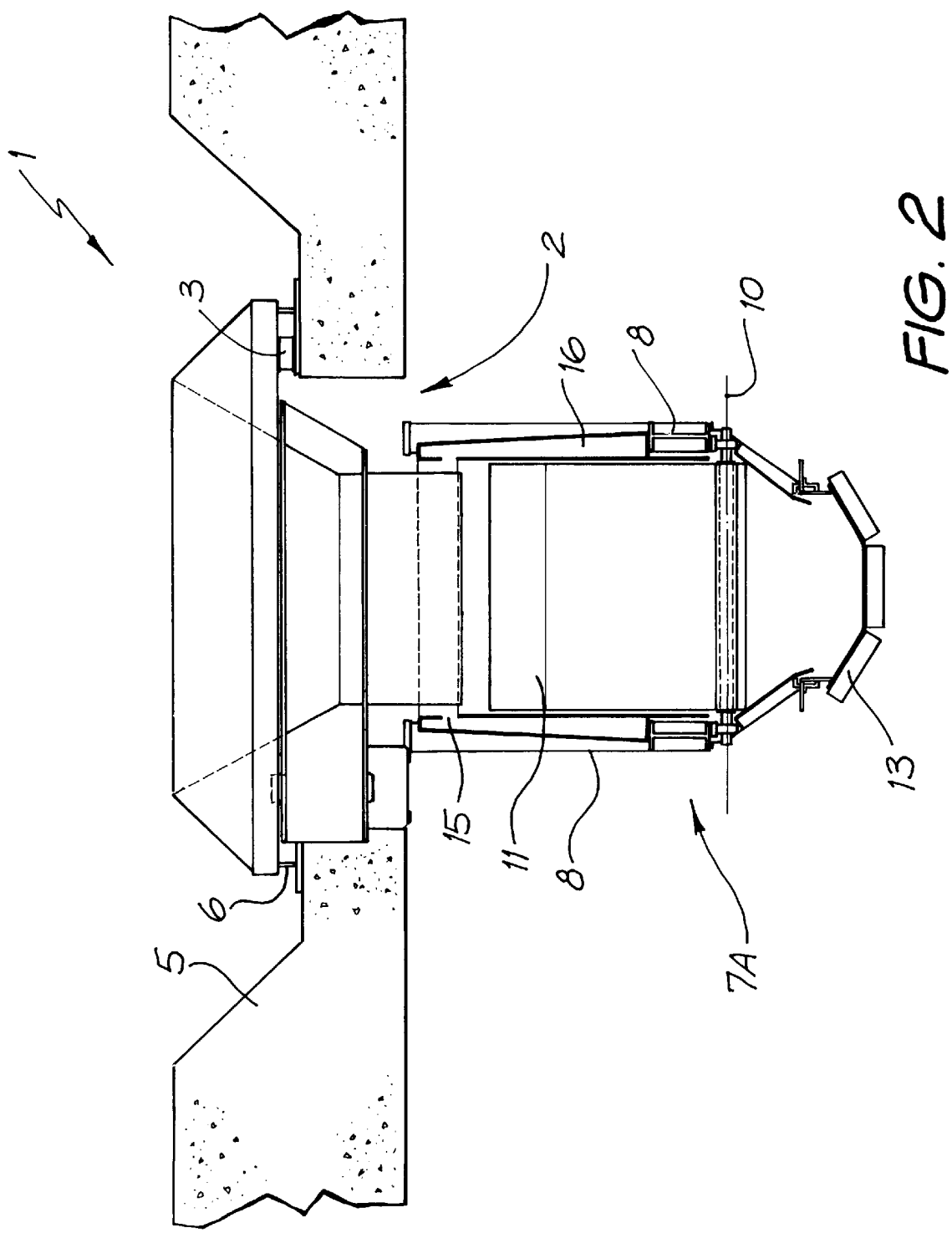
FIG. 2 is an end elevation of the flow control device shown in FIG. 1.

The stockpile reclaim system shown in FIGS. 1 and 2 comprise a vibratory stockpile reclaimer 1 installed in an opening 2 of the base 5 of a stockpile or large silo, bin, hopper or the like (not shown). Granular material such as coal, gravel, grain, ore and the like is stored above the base 5 and delivered through the vibratory stockpile reclaimer 1 to the flow control device 7A and on to the conveyor 13 for discharge. The granular material enters the flow control device 7A through the conical inlet section of the vibratory stockpile reclaimer 1 located above the opening 2 by flexible isolators 3 which are protected by a peripheral skirt 6.

The vibratory stockpile reclaimer 1 is vibrated by a gyrotor 4 which promotes flow of granular material to the inlet of the containment chute 7 where it is controlled by the segment gate 11 to give an accurate discharge opening 14. The angular position of the segment gate 11 is controlled by the actuator 12.

The movable segment gate 11 is pivotally mounted to the support frame 8 about an axis 10 which in FIG. 1 is to one side of the containment chute 7. The actuator moves the segment gate 11 over an arc and the cross-sectional opening 8 formed by the floor and side walls of the containment chute 7 as well as the leading face of the segment gate 11 increases or decreases with the angular movement of the segment gate 11 to control the amount of the discharge. The flow control device of this embodiment of the invention includes the segment gate 11 and actuator or prime mover 12. The actuator may be a screw ball actuator.

Figure 3:
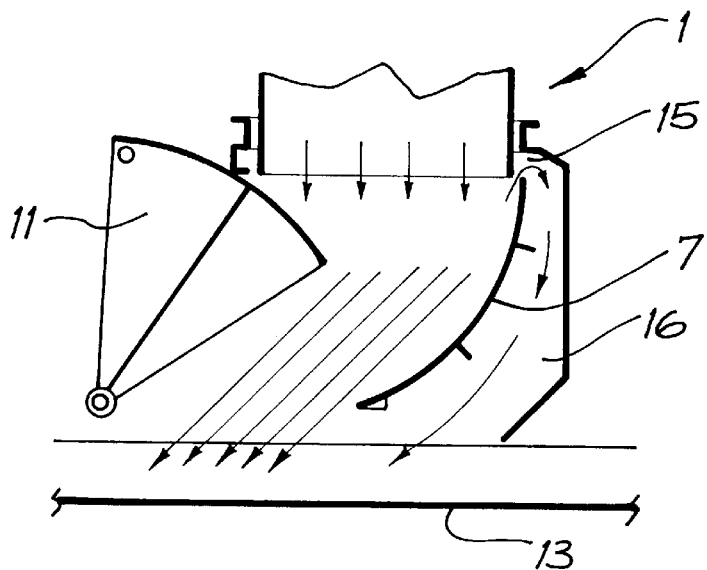
FIG. 3 is a schematic diagram showing the air flow control system.

Excess air entrained in the material stream is vented via peripheral port 15 in the upper section of the containment chute 7 to the exhaust air chamber 16 where it is channeled back into the material flow stream at the conveyor level as can be seen in FIG. 3.

As will be apparent from the above description, when the bulk material feed stream is slowed at the segment gate discharge area, entrained air that usually spills out the clearance areas of the mating parts is now channeled via slots in the upper section of the feed chute into a void in the back of the containment chute.

The air along with any contained particles is then directed back to the belt loading area to be re-combined with the discharging material. As the particle loaded air is below the discharging material any particles of materials are re-combined into the main product discharge stream.

This preferred feature greatly reduces the areas where airborne solids can escape through component clearances into the surrounding atmosphere.

Figure 4:
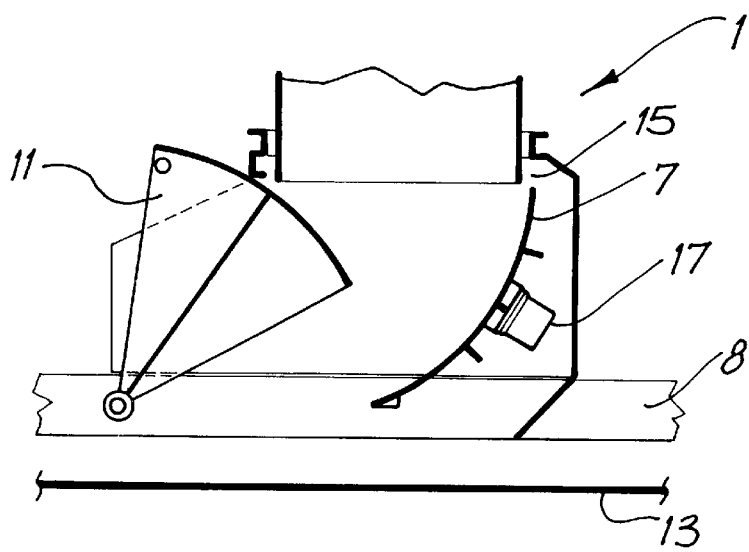
FIG. 4 is a schematic diagram showing a first means for vibrating the floor of the containment chute of the flow control device.

Vibratory forces may be introduced to assist in the discharge if difficult materials or when blending at low flow rates by two preferred methods. The first is shown in FIG. 4 where an electromagnetic vibrator 17 is attached to the containment chute floor 7 by a bracket suitably positioned. Periodic operation of the high frequency low stroke electromagnetic vibrator 17 when the segment gate 11 is in an open position causes material to be discharged.

Figure 5:
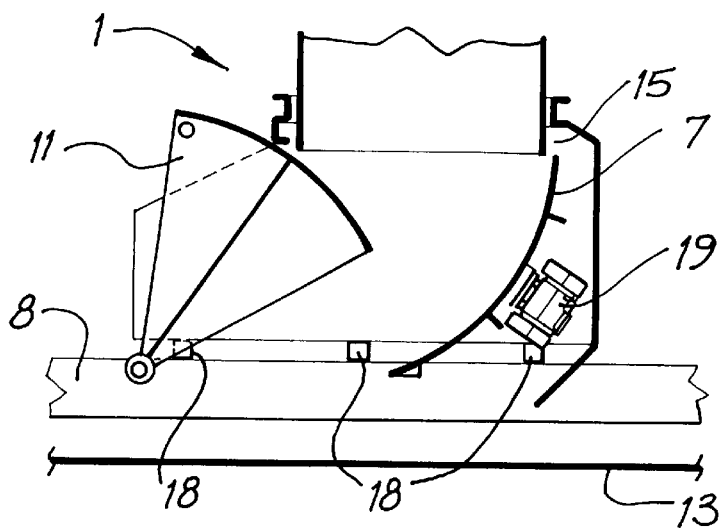
FIG. 5 is a view similar to FIG. 4 showing a second method of vibrating the containment chute of the flow control device.

In the second method shown in FIG. 5, the entire containment chute 7 is mounted on isolators 18 (either steel coil spring or rubber elements) and the entire containment chute is vibrated by electromechanical rotary vibrators 19 which produce a low frequency high stroke movement of the containment chute 7 which will cause material to be discharged. This drive may be arranged to produce either a straight line or an elliptical motion.

The two methods of vibrating the containment chute are selected depending on specific applications.

In the first method, one or two electromagnetic vibrators are fastened to a bracket on the back wall of the chute. Vibration is imparted direct to the surface that contains and directs the bulk product being handled.

In the second method which is for more difficult to move material, the containment chute is designed as an isolated component mounted on vibration dampening elements. Attached to the chute by suitable brackets is at least one electromechanical vibrator motor. These vibrator units physically vibrate the entire containment chute thus inducing flow of the contained material.

Various modifications may be made in details of design and construction to site specific applications without departing from the scope and ambit of the invention.

What is claimed is:

1. A flow control device for use with apparatus for discharging a granular material flow from a material storage, said device comprising:

an inlet adapted to receive granular material from the storage;

a containment chute for receiving material from the inlet and for discharging the material through a discharge opening to a conveyor system;

a pivotally mounted segment gate adapted to move in an arcuate manner across the discharge opening of the containment chute to vary the cross-sectional area of the discharge opening;

an actuator for moving or positioning the segment gate; and a venting port at an upper section of the containment chute, said venting port exhausting into a chamber which leads to a location adjacent the discharge opening.

2. A flow control device according to claim 1, wherein the venting port directs exhaust air from the granular material flow so that it is recombined with the flow from the discharge opening.

3. A flow control device according to claim 1 and further including a vibrator attached to the floor of the containment chute to assist the discharge of difficult materials or when blending at low discharge rates.

4. A flow control device according to claim 1 and further including isolators mounted on the containment chute, together with a vibrator for vibrating the entire containment chute to assist the discharge of difficult materials or when blending at low discharge rates.

* * * * *